(12) United States Patent
Kassel

(10) Patent No.: US 10,033,431 B2
(45) Date of Patent: Jul. 24, 2018

(54) TRAINING OPTIMIZATION OF MULTIPLE LINES IN A VECTORED SYSTEM USING A PREPARED-TO-JOIN GROUP

(71) Applicant: LANTIQ DEUTSCHLAND GmbH, Neubiberg (DE)

(72) Inventor: Pidder Kassel, Oberhaching (DE)

(73) Assignee: Lantiq Deutschland GmbH, Neubiberg (DE)

( * ) Notice: Subject to any disclaimer, the term of this patent is extended or adjusted under 35 U.S.C. 154(b) by 211 days.

(21) Appl. No.: 14/888,048

(22) PCT Filed: May 5, 2014

(86) PCT No.: PCT/EP2014/059131
§ 371 (c)(1),
(2) Date: Nov. 3, 2015

(87) PCT Pub. No.: WO2014/180792
PCT Pub. Date: Nov. 13, 2014

(65) Prior Publication Data
US 2016/0080031 A1 Mar. 17, 2016

Related U.S. Application Data

(60) Provisional application No. 61/819,578, filed on May 5, 2013.

(51) Int. Cl.
*H04B 3/32* (2006.01)
*H04B 3/23* (2006.01)
(Continued)

(52) U.S. Cl.
CPC ............... *H04B 3/32* (2013.01); *H04B 3/238* (2013.01); *H04M 3/002* (2013.01); *H04L 5/1438* (2013.01); *H04M 11/062* (2013.01)

(58) Field of Classification Search
CPC ......... H04B 3/32; H04B 3/238; H04L 5/1438; H04M 3/002; H04M 11/062
See application file for complete search history.

(56) References Cited

U.S. PATENT DOCUMENTS 6,529,786 B1 * 3/2003 Sim .................. G06Q 10/02
700/90
8,958,544 B2 2/2015 Mermans
(Continued)

FOREIGN PATENT DOCUMENTS

| CN | 103004099 A | 3/2013 |
|----|-------------|--------|
| CN | 103067316 A | 4/2013 |
| WO | 2012/076598 A1 | 6/2012 |

OTHER PUBLICATIONS

"Series G: Transmission Systems and Media, Digital Systems and Networks," Self-FEXT cancellation (vectoring) for use with VDSL2 transceivers. ITU-T Telecommunication Standardization Sector of ITU, G.993.5 (Apr. 2010), 25 pages.
(Continued)

*Primary Examiner* — Lisa Hashem
(74) *Attorney, Agent, or Firm* — Eschweiler & Potashnik, LLC

(57) ABSTRACT

A novel procedure is described which provides a method for initialization of a group of CPE devices (short: CPEs) during a training that in part registers capabilities of the CPEs, wherein at least one CPE registers late to the training and thus cannot be registered. In accordance with the example described herein, the method comprises: determining capabilities of the CPEs during a Joining Phase of the training, wherein it is determined whether a CPE device is capable of employing vectoring. The method further comprises placing in a hold status the at least one CPE that registers late by keeping a line active that is coupled to the at least one CPE. Another Joining Phase is provided after the Joining Phase in
(Continued)

order to register the at least one CPE which has registered late.

21 Claims, 7 Drawing Sheets

(51) Int. Cl.
*H04M 3/00* (2006.01)
*H04L 5/14* (2006.01)
*H04M 11/06* (2006.01)

(56) References Cited

U.S. PATENT DOCUMENTS

| | | | | |
|---|---|---|---|---|
| 9,712,208 | B2* | 7/2017 | Tu | H04B 3/32 |
| 2003/0112887 | A1* | 6/2003 | Sang | H04B 3/23 |
| | | | | 375/285 |
| 2004/0198376 | A1* | 10/2004 | Chandhok | H04L 67/04 |
| | | | | 455/456.1 |
| 2005/0053097 | A1* | 3/2005 | Djokovic | H04B 3/32 |
| | | | | 370/497 |
| 2006/0029147 | A1* | 2/2006 | Tsatsanis | H04B 3/32 |
| | | | | 375/267 |
| 2006/0029148 | A1* | 2/2006 | Tsatsanis | H04K 1/10 |
| | | | | 375/267 |
| 2009/0245081 | A1* | 10/2009 | Ashikhmin | H04M 3/18 |
| | | | | 370/201 |
| 2009/0270038 | A1* | 10/2009 | Clausen | H04M 11/062 |
| | | | | 455/63.1 |
| 2011/0268258 | A1* | 11/2011 | Alloin | H04M 3/2209 |
| | | | | 379/32.04 |
| 2012/0082258 | A1 | 4/2012 | Nuzman et al. | |
| 2012/0275591 | A1* | 11/2012 | Mahadevan | H04B 3/32 |
| | | | | 379/417 |
| 2013/0208579 | A1* | 8/2013 | Strobel | H04B 3/32 |
| | | | | 370/201 |
| 2013/0251141 | A1* | 9/2013 | Mermans | H04B 3/32 |
| | | | | 379/406.06 |
| 2014/0050273 | A1* | 2/2014 | Rao | H04B 3/32 |
| | | | | 375/257 |
| 2014/0140187 | A1* | 5/2014 | Wang | H04B 3/32 |
| | | | | 370/201 |
| 2014/0307749 | A1* | 10/2014 | Liang | H04L 27/2601 |
| | | | | 370/509 |
| 2015/0146868 | A1* | 5/2015 | Tu | H04B 3/32 |
| | | | | 379/406.03 |
| 2016/0212036 | A1* | 7/2016 | Oksman | H04B 3/32 |
| 2018/0054235 | A1* | 2/2018 | Liang | H04M 11/062 |

OTHER PUBLICATIONS

Frank van der Putten Alcatel-Lucent Bell N V Belgium: "Draft Recommendation ITU-T G.993.5 (ex G.vector) (for consent); 115R1 (PLEN/15)", ITU-T Draft; Study Period 2009-2012, International Telecommunication Union, Geneva; CH, vol. 4/15, Oct. 8, 2009 (Oct. 8, 2009), pp. 1-74, XP017445337 [retrieved on Oct. 8, 2009], paragraphs [10.1], [10.2], [10.3], [10.4].
"Very high speed digital subscriber line transceivers 2 (VDSL2); G.993.2 (2006) Amendment 6 (11/10)", ITU-T Standard, International Telecommunication Union, Geneva; CH, No. G.993.2 (2006) Amendment 6 (11/10), Nov. 29, 2010 (Nov. 29, 2010), pp. 1-18, XP017563790 [retrieved on Dec. 5, 2011] p. 6-p. 11.
International Search Report of PCT/EP2014/059131.
ITU-T G.994.1.
ITU-T G.992.3.
ITU-T G.993.5.
ITU-T G.992.1.

* cited by examiner

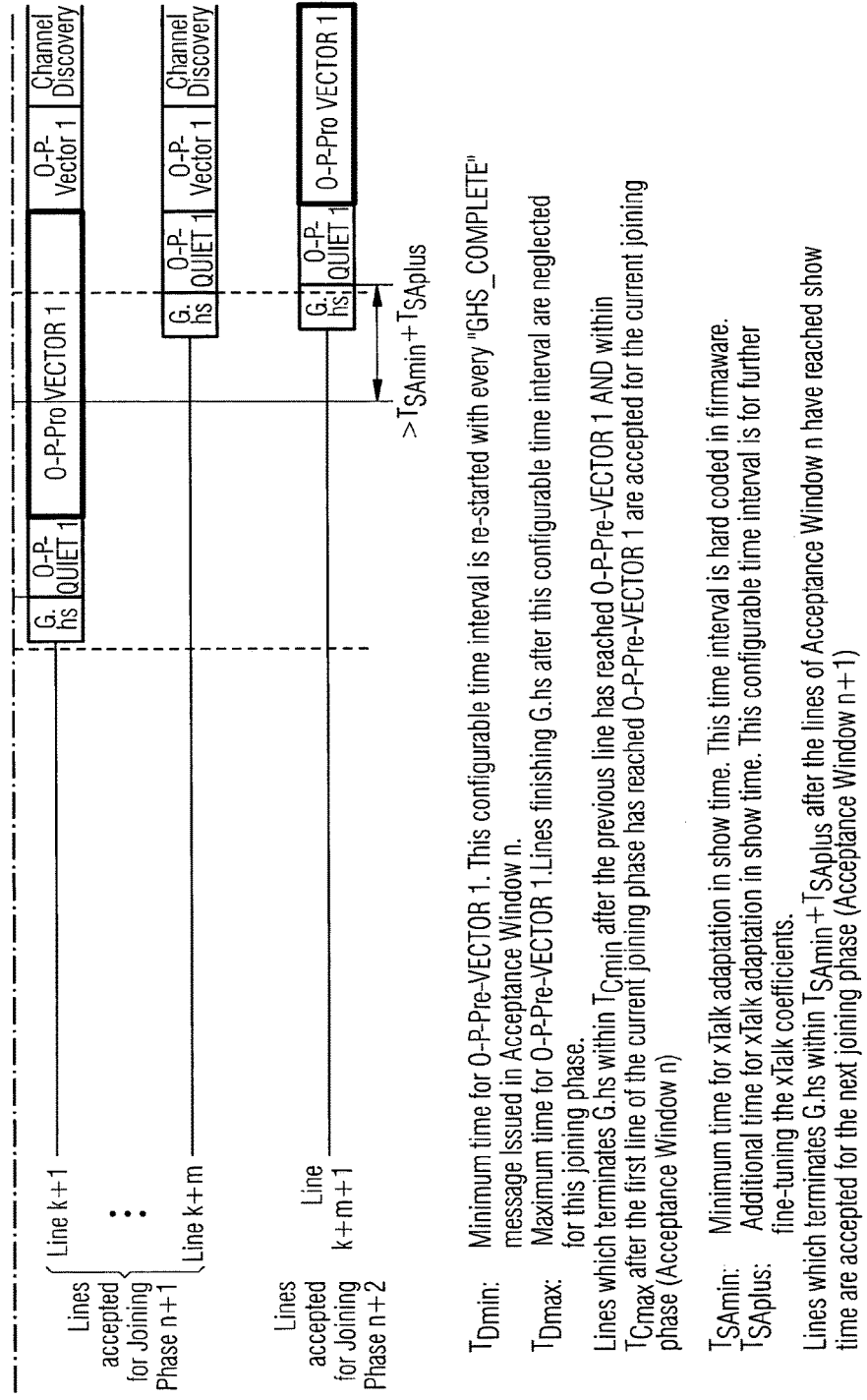

TRAINING OPTIMIZATION OF MULTIPLE LINES IN A VECTORED SYSTEM USING A PREPARED-TO-JOIN GROUP

CROSS-REFERENCE TO RELATED APPLICATION

This application is a national stage entry of PCT/EP2014/059131 having an international application date of May 5, 2014, which application claims priority of U.S. Application Ser. No. 61/819,578, filed May 5, 2013, entitled, "Training Optimization of Multiple Lines in a Vectored System Using a Prepared-to-Join Group". The entire disclosure of the prior application is considered part of the disclosure of this application and is hereby incorporated by reference.

CROSS-REFERENCE TO RELATED APPLICATIONS

This application claims the benefit of U.S. Provisional Application No. 61/819,578 filed May 5, 2013

TECHNICAL FIELD

The present disclosure relates to VDSL (Very-high-bit-rate digital subscriber line) technology, in particular to the initialization of a group of CPE (customer premise equipment (devices) within a VDSL data transmission system.

BACKGROUND

Digital subscriber line (xDSL) technology has developed in recent years in response to the demand for high-speed Internet access. xDSL technology utilizes the communication medium of pre-existing telephone systems. Thus, both plain old telephone systems (POTS) and xDSL systems share a common line for xDSL-compatible customer premises. Similarly, other services such as time compression multiplexing (TCM) integrated services digital network (ISDN) can also share a common line with xDSL and POTS.

Allocations of wire pairs within telephone cables in accordance with service requests have typically resulted in a random distribution of pair utilization with few precise records of actual configurations. Because of the physical proximity of bundled cables (due to pair twisting, cable branching, cable splicing, etc.), crosstalk caused by the electromagnetic interference between the neighboring lines is often the dominating noise source in the transmission environment. In addition, due to pair twisting in cables where cable branching and splicing take place, a wire pair can be in close proximity to many different pairs spanning different portions of its length. At a telephone CO (central office), pairs in close proximity may carry diverse types of service using various modulation schemes, With considerable differences in signal levels (and receiver sensitivities) especially for pairs of considerably different lengths.

There are generally two types of crosstalk mechanisms that are characterized, one being far-end crosstalk (FEXT) and the other one being near-end crosstalk (NEXT). FEXT refers to electromagnetic coupling that occurs when the receiver on a disturbed pair is located at the far end of the communication line as the transmitter of a disturbing pair. Self induced far end crosstalk (self-FEXT) generally refers to interference caused by neighboring lines provisioned for the same type of service as the affected line, or "victim line." In contrast, NEXT results from a disturbing source connected at one end of the wire pair which causes interference in the message channel at the same end as the disturbing source.

Crosstalk (or inter-channel interference) is a major source of channel impairment for Multiple Input Multiple Output (MIMO) communication systems, such as Digital Subscriber Line (DSL) communication systems. As the demand for higher data rates increases, DSL systems are evolving toward higher frequency bands, wherein crosstalk between neighboring transmission lines (that is to say, transmission lines that are in close vicinity such as twisted copper pairs in a cable binder) is more pronounced (the higher frequency, the more coupling). A MIMO system can be described by the following linear model:

$$Y(f)=H(f)X(f)+Z(f), \qquad (1)$$

wherein the N-component complex vector X, respectively Y, denotes a discrete frequency representation of the symbols transmitted over, respectively received from, the N channels, wherein the N×N complex matrix H is referred to as the channel matrix: the (i,j)-th component of the channel matrix H describes how the communication system produces a signal on the i-th channel output in response to a symbol being transmitted to the j-th channel input. The diagonal elements of the channel matrix describe direct channel coupling, and the off-diagonal elements of the channel matrix describe inter-channel coupling (also referred to as the crosstalk coefficients), and wherein the N-component complex vector Z denotes additional noise present over the N channels, such as alien interference, thermal noise and Radio Frequency Interference (RFI).

Different strategies have been developed to mitigate crosstalk and to maximize effective throughput, reach and line stability. These techniques are gradually evolving from static or dynamic spectral management techniques to multi-user signal coordination (or vectoring).

One technique for reducing inter-channel interference is joint signal pre-coding: the transmit data symbols are jointly passed through a pre-coding matrix before being transmitted over the respective communication channels. The pre-coding matrix is such that the concatenation of the pre-coder and the communication channel results in little or no interference at the receiver. This is achieved by adding to the original signal an anti-phase signal that is the inverse of an estimate of the aggregate crosstalk signal.

A further technique for reducing inter-channel interference is joint signal postprocessing: the received data symbols are jointly passed through a crosstalk cancellation matrix before being detected. The crosstalk cancellation matrix is such that the communication channel results in little or no interference at the receiver. This is achieved by subtracting from the received signal an estimate of the aggregate crosstalk signal.

Signal vectoring is typically performed at a traffic aggregation point, whereat all the data symbols that are to be concurrently transmitted and/or received are available. Signal pre-coding is particularly suited for downstream communication, while crosstalk cancellation is particularly suited for upstream communication.

The choice of the vectoring group, that is to say the set of communication lines, the signals of which are jointly processed, is rather critical for achieving good crosstalk cancellation performances. Within that group, each communication line is considered as a disturbing line inducing crosstalk into the other communication lines of the group, and the same communication line is considered as a victim line receiving crosstalk from the other communication lines of the group. Crosstalk from lines that do not belong to the vectoring group is treated as alien noise and is not canceled.

Ideally, the vectoring group should match the whole set of communication lines that physically and noticeably interact with each other. Yet, limited vectoring capabilities and/or specific network topologies may prevent such an exhaustive approach, in which case the vectoring group would include a sub-set only of all the physically interacting lines, thereby yielding limited crosstalk cancellation performances.

The performance of signal pre-coding and crosstalk cancelling depends critically on the component values of the pre-coding and cancellation matrix respectively, which component values are to be computed and updated according to the actual (and varying) crosstalk coupling functions between the respective communication channels.

A known method for estimating the crosstalk coefficients comprises the steps of:
  simultaneously transmitting a plurality of mutually orthogonal crosstalk pilot sequences of length L through respective ones of a plurality of disturber channels,
  measuring errors induced over a victim channel while the pilot sequences are being transmitted,
  correlating the error measurements with respective ones of the plurality of crosstalk pilot sequences, thereby yielding a plurality of correlated error measurements,
  estimating the crosstalk coefficients from the plurality of disturber channels into the victim channel based on respective ones of the plurality of correlated error measurements.

That is, transceiver units send mutually orthogonal downstream and/or upstream pilot signals. Error samples, measuring both interference and noise over the victim channel, are fed back to a Vectoring Control Entity (VCE). Error samples contain both amplitude and phase information on a per-tone basis, or on a per-group-of-tones basis. The error samples are correlated with a given pilot sequence in order to obtain the crosstalk contribution from a specific line. To reject the crosstalk contribution from the other lines, i.e. in order to fulfill the orthogonality requirement, a multiple of L error samples shall be collected and processed. The crosstalk estimates are used for updating the pre-coding and/or cancellation matrix. The process can be repeated as needed to obtain more and more accurate estimates.

The orthogonality requirement further implies that the length L of the pilot sequences is lower-bounded by the size of the vectoring group: the more channels, the longer the pilot sequences, the longer the estimation of the crosstalk coefficients.

This known method has been adopted by the International Telecommunication Union (ITU) for use with VDSL2 transceivers, and is described in the recommendation entitled "Self-FEXT Cancellation (vectoring) For Use with VDSL2 Transceivers", ref. G.993.5 (April 2010). In this recommendation, it is currently envisaged that the pilot signals would be sent on the so-called SYNC symbols, which occur periodically after every 256 DATA symbols.

On a given disturber line, a representative subset of the active carriers (or tones) of the SYNC symbol are 4-QAM modulated by the same pilot digit (+1 or −1) from a given pilot sequence, and thus all transmit one of two complex constellation points, either '1+j' corresponding to '+1', or '−1−j' corresponding to '−1'. The remaining carriers of the SYNC symbol keeps on carrying the typical SYNC-FLAG for EOC message acknowledgment. On a given victim line, error samples are measured and reported for a specific SYNC symbol to the VCE for further crosstalk estimation.

In recommendation G.993.5, it is further assumed that the access node transmits and receives the SYNC symbols over the vectored lines synchronously (super frame alignment) so as pilot signal transmission and error measurements occur simultaneously.

If a line comes into service (e.g., after modem start-up at subscriber premises), the crosstalk coefficients from the new joining line into the already active lines need to be estimated first, and the pre-coder and/or crosstalk canceller be updated accordingly, before the new joining line can transmit at full power over the DATA symbols, else the raising interference may bring about a line retrain on a few active lines (if the newly induced interference exceeds the configured noise margin). Similarly, the crosstalk coefficients from the already active lines into the joining line need to be estimated first, and the pre-coder and/or crosstalk canceller be updated accordingly, before the new joining line starts determining respective carrier bit loadings and gains so as to take full profit from the vectoring gains.

G.993.5 defines new crosstalk acquisition phases during the VDSL2 initialization procedure for acquiring the crosstalk coefficients from the new joining line into the active lines, and vice-versa.

A first crosstalk acquisition phase is carried out after the HANDSHAKE phase, whereby peer transceiver units acknowledges their mutual presence, exchange their respective capabilities and agree on a common mode of operation, and the CHANNEL DISCOVERY phase, during which peer transceiver units exchange basic communication parameters through the SOC channel while transmitting at full power within the assigned communication band. The first crosstalk acquisition phase is termed O-P-VECTOR 1 and R-P-VECTOR 1 for downstream and upstream communication respectively, and aims at estimating the downstream and upstream crosstalk coefficients from the initializing line into the already active lines. O-P-VECTOR 1 and R-P-VECTOR 1 signals comprise SYNC symbols only, which are aligned with the SYNC symbols of the active lines, and thus do not impair communication over the active lines. O-P-VECTOR 1 is followed by O-P-VECTOR 1-1; R-P-VECTOR 1 is followed by R-P-VECTOR 1-1 and R-P-VECTOR 1-2.

A second crosstalk acquisition phase is carried out after the CHANNEL TRAINING phase takes place, that is to say after the time equalizer and/or the echo canceler have been adjusted, and before the CHANNEL ANALYSIS AND EXCHANGE phase, that is to say before signal to Noise and Interference Ratio (SNIR) is measured and corresponding bit loading and gain values are determined for the respective carriers. The second crosstalk acquisition phase is termed O-P-VECTOR 2-1 and R-P-VECTOR 2 for downstream and upstream communication respectively, and aims at estimating the crosstalk coefficients from the already active lines into the initializing line.

A clause in § 10.3 of G.993.5 ITU recommendation states that "if several lines are initialized simultaneously, the initialization procedures of these lines have to be aligned in time, so that all lines pass the vectoring-related phases simultaneously (see clauses 10.3.3.6 and 10.4.3.9)". Further in § 10.3.3.6 op. cit., the following further technical details are mentioned in case multiple lines are initialized: "The downstream crosstalk channels from the initializing lines into the active lines of the vector group should be estimated simultaneously by insuring that O-P-VECTOR 1 signals are sent on all initialization lines during the estimation. This can be done by controlling the end and the start of O-P-VECTOR 1 in each line"; and further: "The upstream crosstalk channels between the initializing lines and the active lines of the vector group should be estimated simultaneously by insuring that R-P-VECTOR 1 signals are sent on all initialization lines during the estimation. This can be done by controlling the end of R-P-VECTOR 1 with the O-P-SYNCHRO V1 signal in each line."

One option would be to require that lines in a vectoring group are always activated sequentially. However, this may lead to a denial of service for any further lines that want to join after a single line is being initialized.

Summarizing the above, FEXT (far-end crosstalk) is the dominant cause of disturbances in DMT (discrete multitone transmission) based transmission systems such as systems which operate in accordance with the VDSL2 standard (see G.993.2, "Very high speed digital subscriber line transceivers 2 (VDSL2)"). To mitigate FEXT, vectoring has been standardized in the VDSL2 standard (see G.993.5, "Self-FEXT cancellation (vectoring) for use with VDSL2 transceivers"). The recommendation G.993.5 covers self-FEXT cancellation in the downstream and upstream directions. This recommendation defines a single method of self-FEXT cancellation, in which FEXT generated by a group of near-end transceivers and interfering with the far-end transceivers of that same group is cancelled. The ITU recommendations G993.2 and G.993.5 are hereby incorporated by reference in their entirety.

According to recommendation G.993.5, FEXT is cancelled by the CO (central office) in the direction CPE-to-CO (upstream direction) by estimating the weights of the upstream crosstalk transfer functions between all lines of the cable binder. For any line (referred to as upstream victim line in the following) the receive data of every other line (referred to as upstream disturber line in the following) within the cable binder weighted by its upstream crosstalk transfer function is subtracted from the data received by the upstream victim line. In the opposite direction (downstream), the error containing the FEXT in downstream is estimated by the receiver of a CPE device and transmitted back to the CO where these errors are used to estimate the weights of the downstream crosstalk transfer functions between all lines of the cable binder. To mitigate downstream FEXT, the transmit data of any line (referred to as downstream victim line in the following) is pre-distorted by the transmit data of every other line (called downstream disturber line in the following) within the cable binder weighted by its downstream crosstalk transfer function. The downstream signals are pre-distorted such that FEXT and pre-distortion are neutralized at the receiver of a CPE device.

The weights are estimated in those symbols which are explicitly foreseen for FEXT estimation and which do not carry any user data. These symbols are called "sync symbols". The data carried in these sync symbols must be orthogonal from line to line. This orthogonality should not be corrupted in such periods of the training (Training Phase) when the received and transmit data is being correlated with the appropriate error signal. To ensure that added connections do not disturb connections, which are already exchanging user data (lines in Showtime), connections to be trained are sending only sync symbols at time instances when no user data is exchanged. These sync symbols are used to estimate the weights of the crosstalk transfer functions from the joining lines to the lines in Showtime.

The estimated weights of the crosstalk transfer functions are used for the rest of the training. According to the recommendation G.995.3 all joining lines must be trained either completely in parallel or one after another. That is, a new training should not be started while another training is already ongoing.

There is a general need for an improved method for initialization of a group of CPE devices during a training that in part registers capabilities of the CPE devices.

SUMMARY

A novel procedure is described which provides a method for initialization of a group of CPE devices (short: CPEs) during a training that in part registers capabilities of the CPEs, wherein at least one CPE registers late to the training and thus cannot be registered. In accordance with the example described herein, the method comprises: determining capabilities of the CPEs during a Joining Phase of the training, wherein it is determined whether a CPE device is capable of employing vectoring. The method further comprises placing in a hold status the at least one CPE that registers late by keeping a line active that is coupled to the at least one CPE. Another Joining Phase is provided after the Joining Phase in order to register the at least one CPE which has registered late.

Furthermore, an apparatus is described which is configured to initialize a group of CPEs during a training that in part registers capabilities of the CPEs, wherein at least one CPE registers late to the training and thus cannot be registered, and wherein capabilities of the CPEs are determined during a joining phase of the training that determines whether a CPE device is capable of employing vectoring. In accordance with one example of the invention the apparatus comprises a vector engine placing the at least one CPE in a hold status that registers late by keeping a line active that is coupled to the at least one CPE, wherein the vector engine provides another Joining Phase after the Joining Phase to register the at least one CPE that registers late.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION

Figure 1:
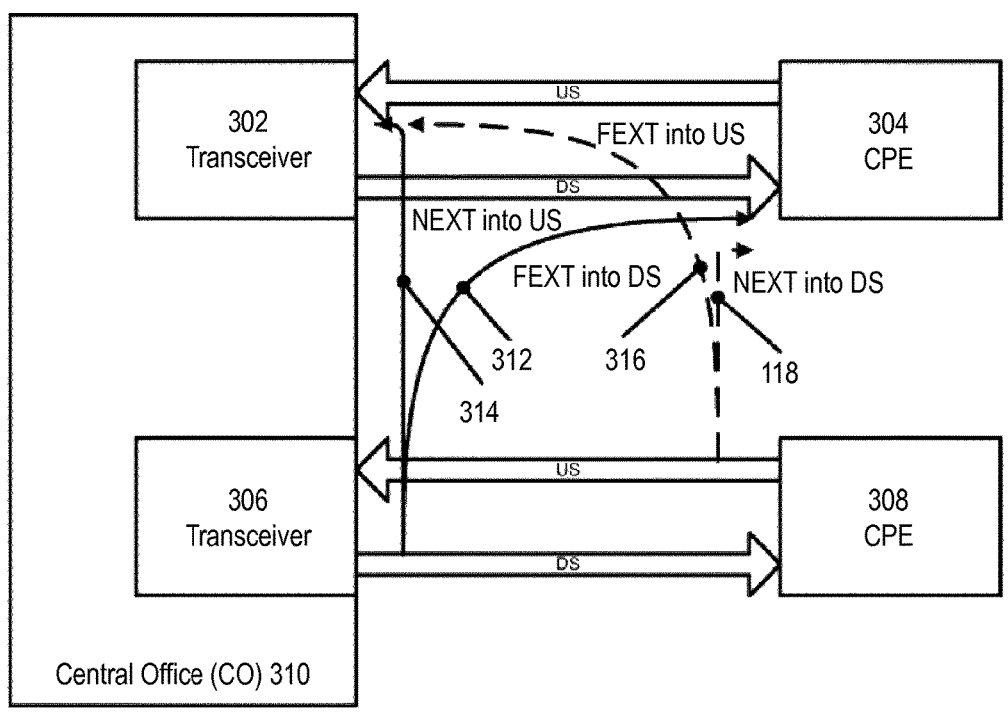
FIG. 1 illustrates the various types of crosstalk typically experienced in a DSL system.

FIG. 1 illustrates the various types of crosstalk typically experienced in a DSL system. For simplicity, central office (CO) 110 comprises two transceivers 102, 106 communicating over two subscriber lines to two sets of customer premises equipment (CPE) devices 104, 108. Transceiver 102 communicates with CPE device 104, and transceiver 106 communicates with CPE device 108. As an illustrative example, the crosstalk from CO transceiver 106 and CPE device 108 to either CO transceiver 102 or CPE device 104 is described. However, it should be understood that interference may also be between the transmitter and receiver on the same subscriber line in both the upstream and downstream paths, which is the near-end echo of the transmit signal.

The term "far-end" refers to scenarios in which the source of interference is away from the receiving side, and the term "near-end" refers to scenarios in which the source of interference is close to the receiving side. For example, interference shown by arrow 112 illustrates noise generated by transceiver 106 coupled into the downstream communications and received by CPE device 104. The term "victim" of "victim user" refers to the line or the circuit being examined for crosstalk, and the term "disturber" describes the source of the crosstalk. Since the noise is generated away from the receiving side, this is referred to as downstream far-end crosstalk (FEXT). Likewise, interference shown by arrow 114 illustrates upstream near-end crosstalk (NEXT). Interference shown by arrow 116 illustrates upstream FEXT, and interference shown by arrow 118 illustrates downstream NEXT. In particular, FEXT is a ubiquitous source of noise in VDSL. Accordingly, various needs exist in the industry to address the aforementioned deficiencies and inadequacies, such as mitigating FEXT.

Vectoring is a transmission method that employs the coordination of line signals for reduction of crosstalk levels and improvement of performance. The degree of improvement depends on the channel characteristics. Vectoring may be for a single user or for multiple-users' benefit.

The ITU recommendation G.993.5 covers self-FEXT (far-end crosstalk) cancellation in the downstream and upstream directions. It defines a single method of self-FEXT cancellation, in which FEXT generated by a group of near-end transceivers and interfering with the far-end transceivers of that same group is cancelled. This cancellation takes place between VDSL2 transceivers, not necessarily of the same profile. The recommendation G.933.5 is intended to be implemented in conjunction with ITU-T G.993.2. Multi-pair digital subscriber line (DSL) bonding (see b-ITU-T G.998.1, b-ITU-T G.998.2, and b-ITU-T G.998.3) may be implemented in conjunction with vectoring.

The techniques described in the recommendation G.993.5 provide means of reducing self-FEXT generated by the transceivers in a multi-pair cable or cable binder. Self-FEXT cancellation techniques are particularly beneficial with short cable lengths (<1 km) and limited near-end crosstalk (NEXT), background noise, and FEXT from systems which are not a part of the vectored group (alien noise). The level of non-self-FEXT noise sources relative to that of self-FEXT sources determines the degree to which self-FEXT reduction can improve performance. Another significant factor is the degree to which the self-FEXT cancelling system has access to the disturbing pairs of the cable. Maximum gains are achieved when the self-FEXT cancelling system has access to all of the pairs of a cable carrying broadband signals. For multi-binder cables, significant gains are possible when the self-FEXT cancelling system has access to all of the pairs of the binder group(s) in which it is deployed and has the ability to cancel at least the majority of dominant self-FEXT disturbers within the binder.

When multiple self-FEXT cancelling systems are deployed in a multi-binder cable without binder management, gains may be significantly reduced.

Figure 2:
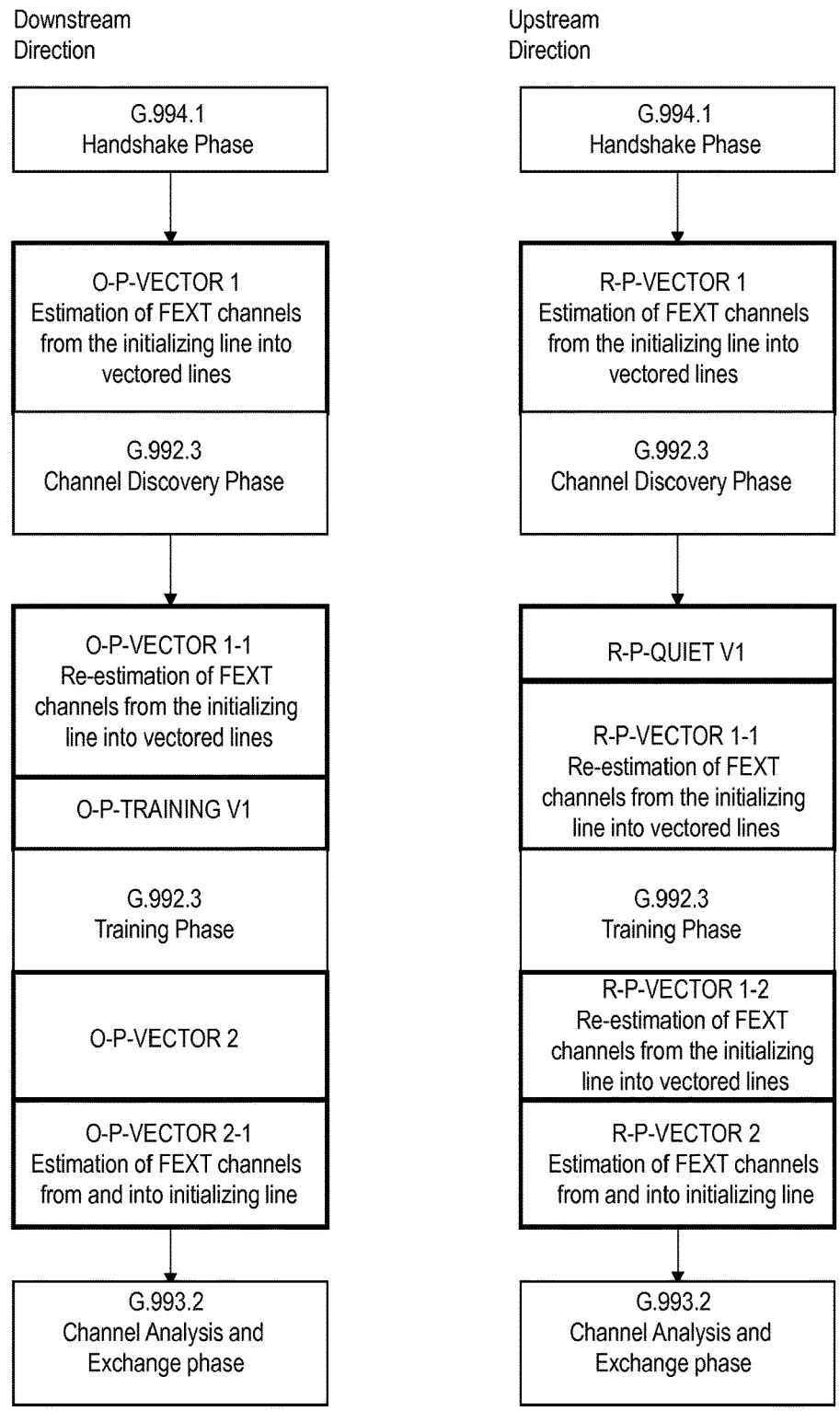
FIG. 2 is a flowchart giving an overview of the ITU-T G.993.5 initialization procedure.

FIG. 2 is taken from the recommendation G.993.5 describing the initialization of a connection supporting Vectoring. The initialization procedure described in in FIG. 2 is based on ITU-T G.993.2 initialization with additional steps for FEXT channel estimation. The final mode of vectored operation (i.e., downstream and upstream vectoring, or downstream only vectoring) is determined during the ITU-T G.994.1 Phase of initialization. FIG. 2 provides an overview of the initialization procedure for both upstream and downstream directions. For recommendation G.933.5, the ITU-T G.993.2 initialization phases are adopted with some modifications to the SOC messages and addition of initialization signals for FEXT channel estimation. The initialization signals added to the ITU-T G.993.2 Channel Discovery phase and Training phase are highlighted in FIG. 2 by bold lines.

If several lines are initialized simultaneously, the initialization procedures of these lines have to be aligned in time, so that all lines pass the vectoring-related phases simultaneously as described in clauses 10.3.3.6 and 10.4.3.9 of the recommendation G.933.5.

In the downstream direction, at the beginning of the Channel Discovery phase, the VTU-O of the initializing line transmits O-P-VECTOR 1 signal which comprises only sync symbols modulated by the pilot sequence and which is aligned with sync symbols of vectored lines. The O-P-VECTOR 1 signal allows the VCE (see also FIG. 6) to estimate FEXT channels from the initializing lines into the vectored lines. The VCE estimates these FEXT channels based on the reported clipped error samples from the VTU-Rs of the vectored lines and enables the pre-coding in the VTU-Os of these vectored lines to cancel FEXT from the initializing lines into these vectored lines during the remainder of the initialization of the initializing lines.

At the beginning of the Training phase, the initializing VTU-O will transmit O-P-VECTOR 1-1 signal, which is the same as O-P-VECTOR 1 and allows the VCE to update the downstream FEXT channel estimates from the initializing lines into the vectored lines, prior to transitioning into the ITU-T G.993.2 Training phase.

After the ITU-T G.993.2 Training phase, the VTU-O transmits the O-P-VECTOR 2 signal, followed by the O-P-VECTOR 2-1 signal, which both comprise sync symbols modulated by the pilot sequence and regular symbols carrying the SOC. During the transmission of O-P-VECTOR 2-1, the VCE estimates FEXT channels from all vectored lines into each initializing line and vice versa. Finally, at the end of the transmission of O-P-VECTOR 2-1, the whole FEXT channel matrix, including FEXT coefficients from the initializing line into the vectored lines and FEXT coefficients from the vectored lines into each initializing line, is estimated by the VCE. At this point the initialization process is complete and the initializing lines may be included in the precoding operation. After O-P-VECTOR 2-1 transmission is complete, the VTU-O of the initializing line enters the Channel Analysis and Exchange phase for estimation of the SNR and determination of the bit loading to be used during Showtime.

In the upstream direction, in order to avoid excessive FEXT into vectored lines, the VTU-R of an initializing line, after detection of the O-SIGNATURE message in the Channel Discovery phase, starts transmitting an R-P-VECTOR 1 signal, which has the same format as O-P-VECTOR 1. During transmission of the R-P-VECTOR 1, the VCE estimates the FEXT channels from the initializing lines into all vectored lines, and enables the VTU-Os of the vectored lines to cancel FEXT from the initializing lines during the remainder of the initialization of the initializing lines. The time position of the upstream sync symbols and the upstream pilot sequence are assigned by the VCE and are indicated to the VTU-R in the O-SIGNATURE message and by special markers added to the O-P-CHANNEL DISCOVERY V1 signal.

Furthermore, other optional parameters may be added to the O-P-SIGNATURE message for upstream transmit power reduction during the initial upstream phase (R-P-VECTOR 1). The upstream transmit power reduction can be used to reduce the crosstalk of the R-P-VECTOR 1 signals into non-vectored lines operating in the same binder and provides a flat attenuation of the upstream transmit PSD of R-P-VECTOR 1 in addition to the standard upstream power back-off as defined in ITU-T G.993.2.

At the beginning of the Training phase, the initializing VTU-R will transmit the R-P-VECTOR 1-1 signal, which is the same as R-P-VECTOR 1 and allows the VCE to update the upstream FEXT channel estimates from the initializing lines into the vectored lines, prior to transitioning into the ITU-T G.993.2 Training phase. The VTU-O transmits the O-P-VECTOR 1-1 signal as a time fill signal while the VTU-R transmits R-P-VECTOR 1-1.

The initial value of timing advance is assigned by the VTU-O and is communicated in O-SIGNATURE, based on the provisional knowledge on the length of the line. If the timing advance is further re-adjusted during the Training phase, then the FEXT channel estimate in the upstream direction will be updated at the end of the Training phase to account for any resulting change in the FEXT channel (signal R-P-VECTOR 1-2 in FIG. 2). The VTU-O transmits the O-P-VECTOR 2 signal as a time fill signal while the VTU-R transmits R-P-VECTOR 1-2.

At the end of the Training phase, the VTU-R transmits R-P-VECTOR 2, which comprises Sync symbols modulated by the pilot sequence and regular symbols carrying the SOC. During the transmission of R-P-VECTOR 2, the VCE estimates the FEXT channels from all vectored lines into the initializing lines and vice versa. Finally, at the end of the R-P-VECTOR 2 transmission, the whole FEXT channel matrix, including FEXT coefficients from the initializing lines into the vectored lines and FEXT coefficients from vectored lines into the initializing lines, are estimated by the VCE. At this point the initialization process is complete and the initializing lines become active members of the vectored group. After R-P-VECTOR 2 transmission is complete, the VTU-R enters the Channel Analysis and Exchange phase for estimation of the SNR and determination of the bit loading to be used during Showtime.

During the transmission of R-P-VECTOR 2, the SOC parameters may be set to provide higher speed SOC, necessary to convey clipped error samples from the VTU-R to the VTU-O. Since both VTU-O and VTU-R already passed the Training phase, the number of repetitions in the SOC may be reduced (similarly to ITU-T G.993.2 during the Channel Analysis and Exchange phase). This will provide a fast backchannel which is necessary for quick estimation of FEXT channels from vectored lines into the initializing line.

As mentioned in the introductory part, the weights of the upstream and downstream crosstalk transfer functions are estimated in the sync symbols. The data carried in these sync symbols has to be orthogonal from line to line. This orthogonality of the sync symbols should not be corrupted in certain phases of an ongoing training by lines which try to setup a connection after just having finished handshake. To avoid corruption of the orthogonality in the sync symbols while a vectoring training is already ongoing (Joining Phase), the CO stops sending any tone to those CPE devices which try to setup a connection as soon as handshake has been finished (Quiet Phase) whereupon these CPE devices interrupt their connection attempt and thus have to start another training attempt after an undefined time.

Figure 3:
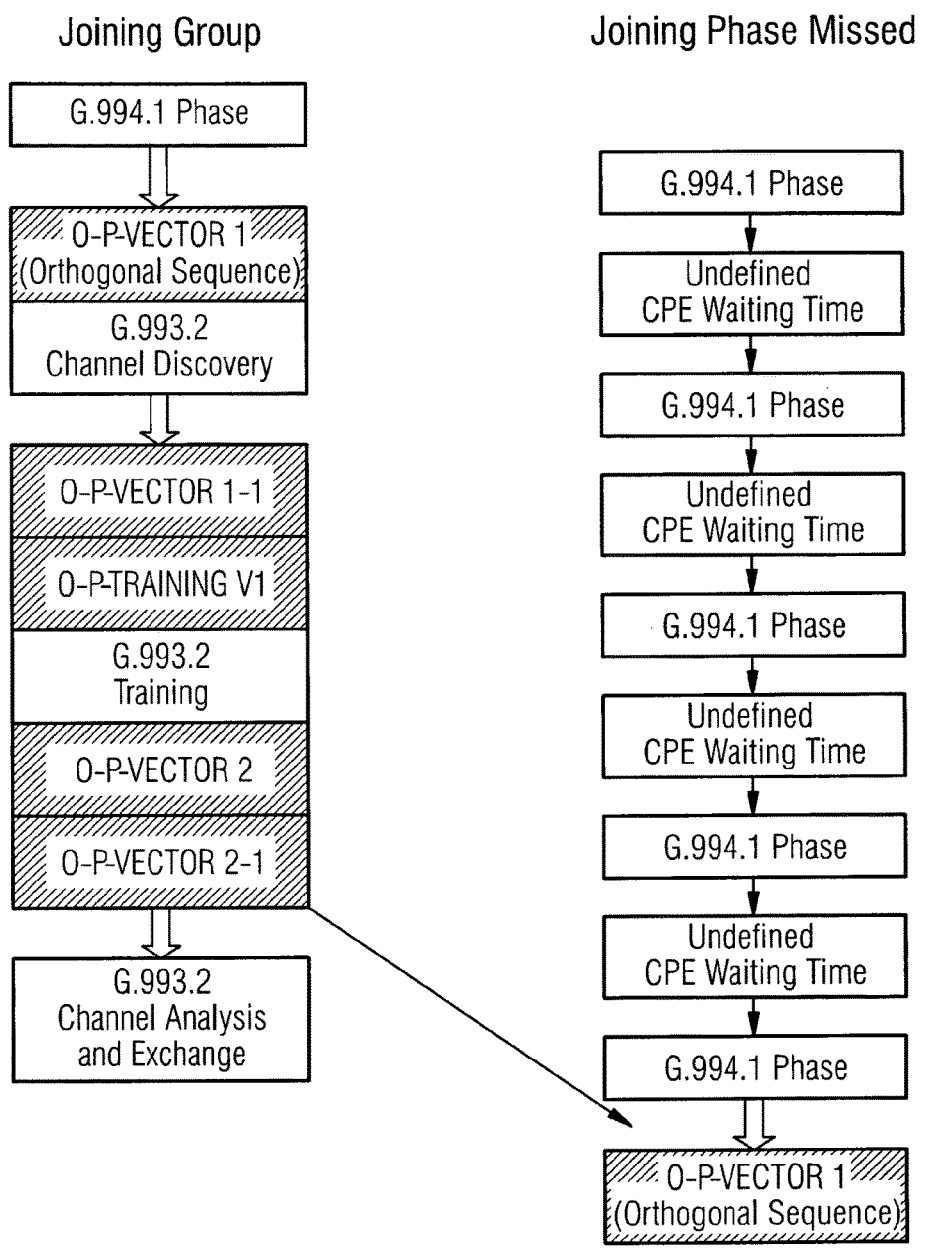
FIG. 3 is a flowchart illustrating the mechanism responsible for a CPE missing the Joining Phase.

The described behavior, which is depicted in FIG. 3, leads to long and unpredictable training times in case that multiple lines want to join a vectoring system, i.e. if multiple CPE devices start establishing a connection with slightly different starting times. FIG. 3 describes the system behavior in case that a vectoring training is already ongoing (Joining Group) while an additional CPE device has started to connect (Joining Phase Missed).

In accordance with one example of the invention, lines (i.e. CPEs connected to the CO via those lines) which attempt to setup a connection while a joining process is already ongoing (and thus could not be considered for the current Joining Phase) are collected in the "Prepared-To-Join"-group for the Joining Phase following the ongoing one. Collecting in the "prepared-To-Join" group places the CPE device(s) in a hold status. According to the capability of the vectoring engine (i.e. the vectoring control entity VCE, see FIG. 6) either one, multiple, or even all of the members of the "Prepared-To-Join"-group are transferred to the Joining Group and trained in parallel as soon as the ongoing Joining Phase has been finished. As needed, other lines can, from now on, be again collected in the "Prepared-To-Join"-group for the next joining phase.

To keep the connection active, the CO sends the "O-P-Pre-VECTOR 1" signal to those CPE devices which are collected in the "Prepared-To-Join"-group. The "O-P-Pre-VECTOR 1" signal shall neither corrupt the orthogonal sequence of the sync symbols nor the user data of the data symbols.

In order to be able to train as many lines as possible in parallel right at the beginning, the O-P-Pre-VECTOR 1 phase can also be applied to the very first Joining Phase following the system startup. Following this procedure, the training time in case of multi-line joining can be significantly reduced without impacting the performance of those VDSL2 connections, which are already in Showtime. The training of a line which attempts to setup a connection while a joining phase is already ongoing has no longer to be interrupted and thus a restart including handshake (see G.994.1) is no longer needed what in case of multiline joining additionally leads to a more robust and reproducible training. As CO stands for Central Office, it may designate any component of Central Office Equipment such as a Digital Subscriber Line Access Multiplexer (DSLAM) or a linecard of a DSLAM. In fact, the vectoring control entitiy may be arranged on a line card used in a DSLAM or in a module of a DSLAM servicing more than one linecard.

The Joining Phases may include a handshake procedure, which is compliant with the ITU-T G.994.1 standard. The mentioned training (i.e. the Training Phase) is accomplished in compliance with the ITU-T G.992.3 and 993.5 standards. The CPE device(s) of the "Prepared-to-Join" Group are placed in a hold status by keeping the line(s) active that is coupled to the respective CPE device(s). Keeping a line active is accomplished by sending a signal to each CPE device, wherein the signal does neither impact the joining lines nor the lines (CPE devices) in Showtime. For example, the signal includes only Flag Tones in its sync symbols, e.g. when all Pilot Tones are used for the crosstalk adaption.

However, in cases in which not all Pilot Tones are used for crosstalk adaption, also the unused Pilot Tones may be used instead of or in addition to the Flag Tones.

Figure 4:
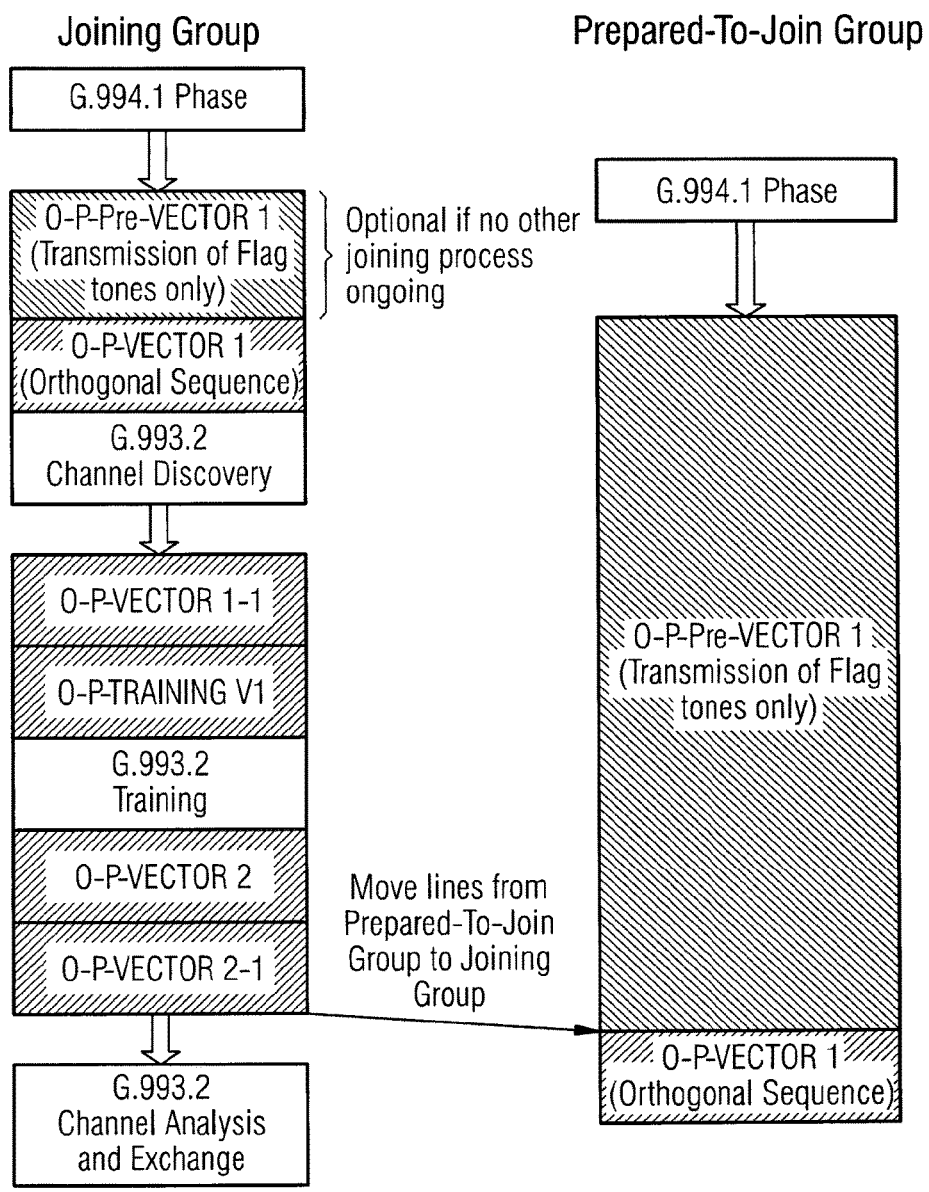
FIG. 4 is a flow chart illustrating one improved initialization method in accordance with one example of the invention and the embedding of the method in the standardized VDSL2 training including vectoring.

The embedding of this procedure in the standardized VDSL2 training including vectoring is depicted in FIG. 4. As compared to the existing standard the following extensions of the vectoring training are proposed: (1) definition of the "Prepared-To-Join"-group, (2) definition of a new state (O-P-Pre-VECTOR 1) between state O-P-QUIET and O-P-VECTOR-1, and (3) definition of the O-P-Pre-VECTOR 1 signal (flag tones only) from the CO to the CPE(s).

Accordingly, the improved procedure described herein provides a method for initialization of a group of CPE devices (short: CPEs) during a training that in part registers capabilities of the CPEs, wherein at least one CPE registers late to the training and thus cannot be registered for the reasons described above. In accordance with the example described herein, the method comprises: determining capabilities of the CPEs during a Joining Phase of the training, wherein it is determined whether a CPE device is capable of employing vectoring. The method further comprises placing in a hold status (i.e. assign to the "Prepared to Join"-group) the at least one CPE that registers late by keeping a line active that is coupled to the at least one CPE. Another Joining Phase is provided after the Joining Phase in order to register the at least one CPE which has registered late. The step of placing in a hold status may maintain the line as active by sending signals to the at least one CPE that indicates that the at least one CPE will be registered at a later time.

The method described above may be implemented in an apparatus which includes a vector engine that is configured to place the at least one CPE, that registers late, in a hold status (i.e. assign to the "Prepared to Join"-group) by keeping a line active that is coupled to the at least one CPE. The vector engine provides another Joining Phase after the Joining Phase to register the at least one CPE that registers late.

Figure 5A:
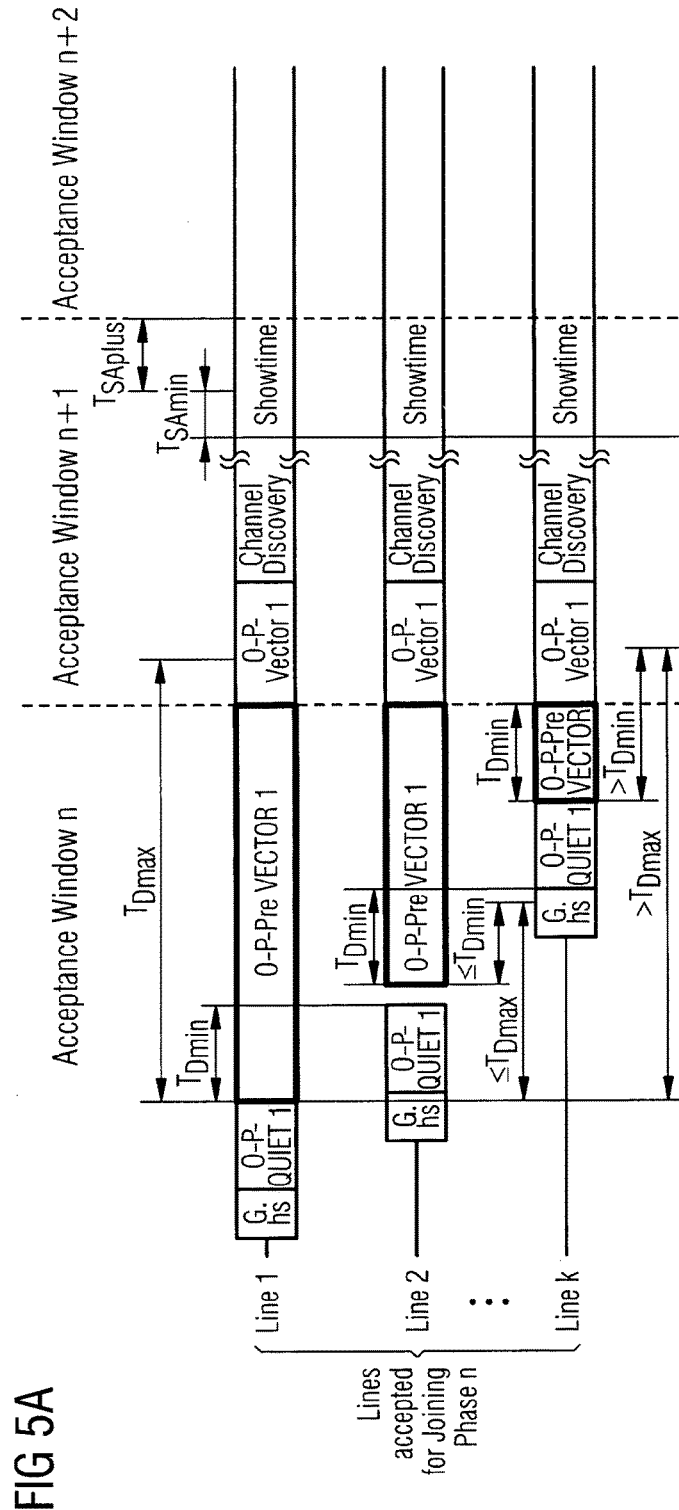
FIG. 5 illustrates a typical sequence of multiple joining phases during the start up of a vectoring capable VDSL2 system comprising multiple lines.

FIG. 5 depicts a typical sequence of multiple joining phases during the start up of a vectoring capable VDSL2 system comprising multiple lines. The Acceptance Window n corresponds to a configurable time interval right after reset. In this time interval all lines which have started to setup a connection are collected for the first Joining Phase (Line 1 to Line k). The Acceptance Window n+1 is opened for collecting those lines for the second Joining Phase which have started to setup a connection while Line 1 to Line k are being trained (Line k+1 to Line k+m). In this example the last line (Line k+m+1) tries to set-up a connection while the second joining group is being trained (Acceptance Window n+2). The timings outlined FIG. 5 are for controlling the size of the Acceptance Windows.

In the timing diagrams of FIG. 5 $T_{Dmin}$ is the minimum time for O-P-Pre-VECTOR-1. This configurable time interval Is re-started with every "GHS_COMPLETE" message Issued In Acceptance Window n. $T_{Dmax}$ denotes the maximum time for O-P-Pre-VECTOR-1. Lines finishing G.hs after this configurable time interval are neglected for the current joining Phase. Lines which terminate G.hs within $T_{Dmax}$ after the previous line has reached O-P-Pre-VECTOR-1 and within $T_{Dmax}$ after the first line of the current Joining Phase has reached O-P-Pre-VECTOR-1 are accepted for the current Joining Phase (Acceptance Window n). The time TSAmin is the minimum time for xTalk adaptation in Showtime. This time interval is hard-coded in the firmware. $T_{SAplus}$ is an additional time for xTalk adaptation In Showtime. This configurable time interval Is for further fine-tuning of the xTalk coefficients. Lines which terminate G.hs within $T_{SAmin}+T_{SAplus}$ after the lines of Acceptance Window n have reached Showtime are accepted for the next Joining Phase (Acceptance Window n+1).

Figure 6:
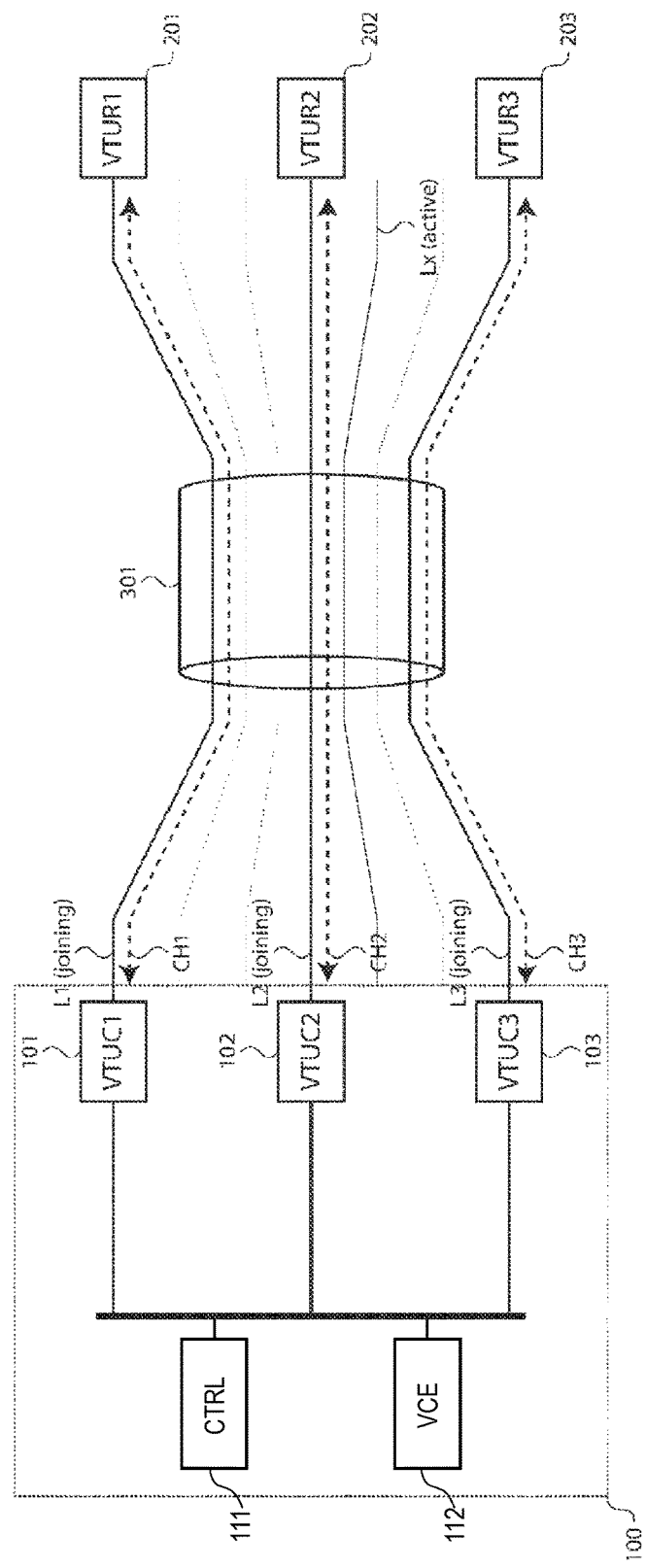
FIG. 6 represents an exemplary VDSL2 communication system in accordance to the present invention.

FIG. 6 illustrates a DSLAM (Digital Subscriber Line Access Multiplexer) 100 located at a CO (central office) or at a remote location closer to subscriber premises, and comprising G.993.5 compliant transceiver units 101 (or VTUC1), 102 (or VTUC2) and 103 (or VTUC3), a line initialization controller 111 (or CTRL), and the above-mentioned vectoring engine or vectoring control entity 112 (or VCE). The line initialization controller 111 as we as the vectoring control entity 112 are coupled to the transceivers units 101, 102 and 103. Regardless of the actual location of the DLSAM it is regarded as part of Central Office Equipment (COE).

The DSLAM 100 is coupled to CPE devices via Unshielded Twisted Pairs (UTP), such as CATS cables. The first transceiver unit 101 is coupled to a first remote transceiver unit 201 (or VTUR1) via a first subscriber line L1; the second transceiver unit 102 is coupled to a second remote transceiver unit 202 (or VTUR2) via a second subscriber line L2; and the third transceiver unit 103 is coupled to a third remote transceiver unit 203 (or VTUR3) via a third subscriber line L3. The remote transceiver units 201, 202 and 203 form part of e.g. a modem, a gateway, a router, a set top box, a laptop, etc.

The subscriber lines L1, L2 and L3 are bundled in a cable binder 301 together with further subscriber lines, and induce crosstalk into each other as they are in close vicinity over whole or part of their length. In DMT based DSL systems, crosstalk mostly reduces to FEXT (Far-End Crosstalk); some substantial amount of the signal transmitted by a transceiver unit (the disturber) couples into a neighboring line and impairs reception of the direct signal transmitted over that neighboring line at a remote transceiver unit (the victim). For instance, the downstream signal transmitted by the VTUC 101 over line L1 couples into line L2 and is detected as noise by the VTUR 202. Also, the upstream signal transmitted by the VTUR 203 over line L3 couples into line L1 and is detected as noise by the VTUC 101.

The DSLAM 100 further includes a precoder to mitigate FEXT in downstream direction and/or a FEXT canceller to mitigate FEXT in upstream direction. Presently, the subscriber lines L1, L2 and L3 form part of the same vectoring group, which may comprises further subscriber lines, and the precoder and/or FEXT canceller are configured to mitigate downstream and/or upstream crosstalk between lines of the vectoring group.

Typically, the frequency samples of each downstream data symbol of each subscriber line are forwarded to the precoder by the transceiver units, and crosstalk-compensated samples are returned by the precoder to the transceiver units for Inverse Discrete Fourier Transform (IDFT), Digital to Analog Conversion (DAC) and further transmission over the subscriber line. Similarly, the frequency samples of each received upstream data symbol are forwarded to the crosstalk canceller by each transceiver unit, and (almost) crosstalk-free samples are returned by the crosstalk canceller to each transceiver unit for detection and demodulation.

Primarily, the transceiver units 101, 102 and 103 are configured to terminate the subscriber lines L1, L2 and L3 respectively, and to initialize and operate DSL communication channels CH1, CH2 and CH3, respectively. So are the remote transceiver units 201, 202 and 203.

The transceiver units 101, 102 and 103 are further configured to notify the line initialization controller 111 about a new line starting up (joining line), being on behalf of the transceiver unit at the central office or the transceiver unit at the customer premises, and further to carry out the DSL initialization procedure after approval from the line initialization controller 111.

The communication channels CH1, CH2 and CH3 comprise a downstream data communication path and an upstream data communication path using distinct downstream and upstream frequency bands (frequency division multiplexing). Respective bit loadings and gains for downstream and upstream carriers are determined and agreed upon during line initialization, thereby yielding a total downstream data rate and a total upstream data rate.

The DSL initialization procedure comprises a handshake phase, multiple crosstalk acquisition phases, a channel discovery phase, a channel training phase, and a channel analysis and exchange phase.

The handshake phase is described in G.994.1, and makes use of one or more predefined set of carriers (so-called signaling family) depending on the one or more specific annex of the recommendation being supported. Those predefined carrier sets comprise very few carriers only (typically 2 or 3), thereby causing little interference on neighboring lines.

The handshake procedure comprises a first sub-phase A during which peer transceiver units acknowledge their mutual presence by exchanging probe signals comprising a carrier set and acquire clock synchronization for the probe signals, and a second sub-phase B during which peer transceiver units exchange their respective capabilities and agree on a common mode for training and operation. A successful completion of the handshake phase will lead to the first crosstalk acquisition phase O-P-VECTOR 1.

All messages in the handshake phase are sent with the one or more limited set of carriers. All carrier frequencies within a carrier set, and all carrier sets, are simultaneously modulated with the same data bits using Differential Phase Shift Keying (DPSK). The transmit point is rotated 180° from the previous point if the transmit bit is a 1, and the transmit point is left unchanged if the transmit bit is a 0.

Initially, the VTUR is in state R-SILENT0 transmitting silence, and the VTUC is in state C-SILENT1 transmitting silence.

For duplex mode of operation, and in the event of the VTUR initiating the initialization procedure, the first handshake sub-phase A starts with the VTUR transmitting a R-TONES-REQ signal from one or both of its signaling family with phase reversals every 16 ms. When this has been detected by the VTUC, the VTUC shall respond by transmitting a C-TONES signal from one or both of its signaling family. When this has been detected by the VTUR, the VTUR shall transmit silence (R-SILENT1) for 50 to 500 ms and shall then transmit a RTONE1 signal from only one signaling family. When the VTUC has detected RTONE1 signal, it shall respond by transmitting GALF (0x81=one complement of 0x7E) on modulated carriers (C-GALF1). When the VTUR has detected GALF, it shall respond by transmitting FLAGs (0x7E) on modulated carriers (RFLAG1). When the VTUC has detected FLAGS, it shall respond by transmitting FLAGs (C-FLAG1). When the VTUR has detected FLAGS, it shall enter the sub-phase B by initiating the first message transaction.

In the event of the VTUC initiating the initialization procedure, the first handshake sub-phase A starts with the VTUC directly transmitting C-TONES and keeps on as aforementioned.

Slightly different timing and signals are defined for half-duplex mode of operation.

The second handshake sub-phase B starts with the VTUR sending a CAPABILITY LIST REQUEST CLR message conveying the capabilities of the VTUR (that is to say, a list of possible modes of operation), and whereby the VTUR further requests the VTUC capabilities. The VTUC replies with a CAPABILITY LIST CL message conveying the VTUC capabilities. The VTUR acknowledges the good receipt of the CL message by returning an ACK(1) acknowledgment.

The sub-phase B carries on by either the VTUR or the VTUC selecting a common mode of operation according to the advertised capabilities. This is achieved by issuing a MODE SELECT MS message conveying the selected mode of operation, and by returning an ACK(1) acknowledgment. Typically, the VTUR selects the most appropriate mode of operation at once and issues the MS message. Yet, the VTUR can request the VTUC to select a particular mode of operation by issuing a MODE REQUEST MR message, or can propose a particular mode of operation while leaving the final decision to the VTUC by issuing a MODE PROPOSAL MP message. Once a particular mode of operation is acknowledged, the VTUC and the VTUR enter the O-P-VECTOR 1 and R-P-VECTOR 1 crosstalk acquisition phases respectively.

G.994.1 defines a provision for re-iterating through the sub-phase B by allowing the VTUC to respond to the MS message with a REQUEST-CAPABILITY LIST REQUEST REQ-CLR message requesting the VTUR to proceed again with CLR/CL/ACK(1) message exchange and further MS/MR/MP/ACK(1) message exchange, and without returning to the initial transaction state (R-SILENT0).

The line initialization controller 111 is further configured to control the DSL initialization procedure over each subscriber line, and more specifically to supply the VTUCs 101, 102 and 103 with a number n of iterations for the second handshake sub-phase B to be carried out, as well as with an additional delay D for answering any message requiring a specific response or acknowledgment from the VTUC during the sub-phase B, such as a CLR or MS or MR or MP message.

The VTUCs 101, 102 and 103 are further configured to measure the execution times TA and TB of the first and second handshake sub-phases A and B respectively (not including the configured additional delay D, if any), and to report the so-measured execution time to the line initialization controller 111. By so doing, the execution time spread from different CPE manufacturers and/or implementations is accounted for.

Although the initialization controller 111 has been depicted as a central unit within the access node 100, it can be partly or wholly distributed across the VTUCs 101, 102 and 103.

Exemplary implementations discussed herein may have various components collocated; however, it is to be appreciated that the various components of the arrangement may be located at distant portions of a distributed network, such as a communications network and/or the Internet, or within a dedicated secure, unsecured and/or encrypted arrangement. Thus, it should be appreciated that the components of the arrangements may be combined into one or more apparatuses, such as a modem, or collocated on a particular node of a distributed network, such as a telecommunications network. Moreover, it should be understood that the components of the described arrangements may be arranged at any location within a distributed network without affecting the operation of the arrangements. For example, the various components can be located in a Central Office modem (CO, ATU-C, VTU-0), a Customer Premises modem (CPE, ATU-R, VTU-R), an xDSL management device, or some combination thereof. Similarly, one or more functional portions of the arrangement may be distributed between a modem and an associated computing device.

The above-described arrangements, apparatuses and methods may be implemented in a software module, a software and/or hardware testing module, a telecommunications test device, a DSL modem, an ADSL modem, an xDSL modem, a VDSL modem, a linecard, a G.hn transceiver, a MoCA® transceiver, a Homeplug transceiver, a powerline modem, a wired or wireless modem, test equipment, a multicarrier transceiver, a wired and/or wireless wide/local area network system, a satellite communication system, network-based communication systems, such as an IP, Ethernet or ATM system, a modem equipped with diagnostic capabilities, or the like, or on a separate programmed general purpose computer having a communications device or in conjunction with any of the following communications protocols: CDSL, ADSL2, ADSL2+, VDSL1, VDSL2, HDSL, DSL Lite, IDSL, RADSL, SDSL, UDSL, MoCA, G.hh, Homeplug or the like.

Additionally, the arrangements, procedures and protocols of the described implementations may be implemented on a special purpose computer, a programmed microprocessor or microcontroller and peripheral integrated circuit element(s), an ASIC or other integrated circuit, a digital signal processor, a flashable device, a hard-wired electronic or logic circuit such as discrete element circuit, a programmable logic device such as PLD, PLA, FPGA, PAL, a modem, a transmitter/receiver, any comparable device, or the like. In general, any apparatus capable of implementing a state machine that is in turn capable of implementing the methodology described and illustrated herein may be used to implement the various communication methods, protocols and techniques according to the implementations.

Furthermore, the disclosed procedures may be readily implemented in software using object or object-oriented software development environments that provide portable source code that can be used on a variety of computer or workstation platforms. Alternatively, the disclosed arrangements may be implemented partially or fully in hardware using standard logic circuits or VLSI design. The communication arrangements, procedures and protocols described and illustrated herein may be readily implemented in hardware and/or software using any known or later developed systems or structures, devices and/or software by those of ordinary skill in the applicable art from the functional description provided herein and with a general basic knowledge of the computer and telecommunications arts.

Moreover, the disclosed procedures may be readily implemented in software that can be stored on a computer-readable storage medium, executed on programmed general-purpose computer with the cooperation of a controller and memory, a special purpose computer, a microprocessor, or the like. In these instances, the arrangements and procedures of the described implementations may be implemented as program embedded on personal computer such as an applet, JAVA® or CGI script, as a resource residing on a server or computer workstation, as a routine embedded in a dedicated communication arrangement or arrangement component, or the like. The arrangements may also be implemented by physically incorporating the arrangements and/or procedures into a software and/or hardware system, such as the hardware and software systems of a test/modeling device.

The implementations herein are described in terms of exemplary embodiments. However, it should be appreciated that individual aspects of the implantations may be separately claimed and one or more of the features of the various embodiments may be combined.

I claim:

1. A method for initialization of a group of customer premises equipment devices (CPEs) during a training that registers capabilities of the CPEs, wherein at least one CPE registers late to the training and cannot be registered; the method comprising:
    determining capabilities of the CPEs during a joining phase of the training, wherein it is determined whether a CPE device is capable of employing vectoring;
    placing in a hold status the at least one CPE that registers late by keeping a line active that is coupled to the at least one CPE; and
    providing another joining phase after the joining phase to register the at least one CPE that registers late.

2. The method according to claim 1, further wherein the step of placing in a hold status maintains the line as active by sending signals to the at least one CPE that indicates that the at least one CPE will be registered at a later time.

3. The method of claim 1 wherein the Joining Phase includes a handshake procedure compliant with the ITU-T G.994.1 standard.

4. The method of claim 1 wherein the training includes a Training Phase compliant with the ITU-T G.992.3 and 993.5 standards.

5. The method of claim 1 wherein determining capabilities includes: determining whether the at least one CPE supports being placed in a hold status.

6. The method of claim 1 wherein keeping a line active that is coupled to the at least one CPE includes: sending a signal to the CPE which does neither impact the joining lines nor the lines in Showtime.

7. The method of claim 6, wherein the signal, which does neither impact the joining lines nor the lines in Showtime, includes only Flag Tones.

8. The method according to claim 1, wherein the other joining phase is provided directly after the joining phase.

9. The method according to claim 1, wherein capabilities to be determined include capabilities as defined in ITU-T recommendation G.992.1.

10. The method according to claim 9, wherein the capabilities include at least echo cancellation capabilities.

11. An apparatus for initialization of a group of customer premises equipment devices (CPEs) during a training that registers capabilities of the CPEs, wherein at least one CPE registers late to the training and cannot be registered, wherein capabilities of the CPEs are determined during a joining phase of the training that determines whether a CPE device is capable of employing vectoring, the apparatus comprising:
    a vector engine placing the at least one CPE in a hold status that registers late by keeping a line active that is coupled to the at least one CPE; and
    wherein the vector engine provides another joining phase after the joining phase to register the at least one CPE that registers late.

12. The apparatus according to claim 11, wherein the vector engine places the at least one CPE in a hold status by maintaining the line as active by sending signals to the at least one CPE that indicates that the at least one CPE will be registered at a later time.

13. The apparatus according to claim 11, wherein the vector engine is a vectoring control entity (VCE) located within an Access Node of a Digital Subscriber Line Access Multiplexer (DLSAM).

14. The apparatus according to claim 11, wherein the Joining Phase includes a handshake procedure in accordance with the ITU-T G.994.1 standard.

15. The apparatus according to claim 11, wherein the determined capabilities include the capability of the at least one CPE to be placed in a hold status.

16. The apparatus according to claim 11, wherein capabilities to be determined include capabilities as defined in ITU-T recommendation G.992.1.

17. The apparatus according to claim 16 wherein the capabilities include at least echo cancellation capabilities.

18. The apparatus according to claim 11, wherein keeping a line active includes: sending a signal to the CPE which does neither impact the joining lines nor the lines in Showtime.

19. The apparatus according to claim 18, wherein the signal, which does neither impact the joining lines nor the lines in Showtime, includes only Flag Tones.

20. The apparatus according to claim 11, wherein the other joining phase is provided directly after the joining phase.

21. A linecard for use in a DSLAM and configured to initialize a group of customer premises equipment devices (CPEs) during a Training Phase in which capabilities of the CPEs are registered, wherein at least one CPE registers late to the training and cannot be registered, wherein capabilities of the CPEs are determined during a Joining Phase of the Training Phase for determining whether a CPE device is capable of employing vectoring, the linecard comprising:

a vector engine configured to place the at least one CPE, that registers late, in a hold status by keeping a line active that is coupled to the at least one CPE; and wherein the vector engine provides another joining phase after the joining phase to register the at least one CPE that registers late.

* * * * *